United States Patent
Grieser-Schmitz et al.

(10) Patent No.: US 9,476,539 B2
(45) Date of Patent: Oct. 25, 2016

(54) RIGID FOAM ENVELOPMENT OF THE CONNECTIONS OF PIPES

(75) Inventors: Christof Grieser-Schmitz, Osnabrueck (DE); Peter Huntemann, Stemshorn (DE); Annika Halwe-Bommelmann, Rahden (DE); Wilhelm Lindemann, Preussisch Oldendorf (DE)

(73) Assignee: BASF SE, Ludwigshafen (DE)

( * ) Notice: Subject to any disclaimer, the term of this patent is extended or adjusted under 35 U.S.C. 154(b) by 333 days.

(21) Appl. No.: 13/006,728

(22) Filed: Jan. 14, 2011

(65) Prior Publication Data

US 2011/0175346 A1 Jul. 21, 2011

Related U.S. Application Data

(60) Provisional application No. 61/295,776, filed on Jan. 18, 2010.

(51) Int. Cl.
| | |
|---|---|
| *C08G 18/22* | (2006.01) |
| *F16L 59/20* | (2006.01) |
| *C08G 18/48* | (2006.01) |
| *F16L 13/02* | (2006.01) |
| *C08G 101/00* | (2006.01) |

(52) U.S. Cl.
CPC ............ *F16L 59/20* (2013.01); *C08G 18/225* (2013.01); *C08G 18/4812* (2013.01); *F16L 13/0272* (2013.01); *C08G 2101/0025* (2013.01); *C08G 2101/0058* (2013.01); *C08G 2101/0083* (2013.01); *C08G 2105/02* (2013.01)

(58) Field of Classification Search
CPC ............ C08G 18/4812; C08G 18/225; C08G 2101/0025; C08G 2101/0083; C08G 2101/0058; C08G 2105/02; F16L 59/20; F16L 13/0272
USPC .................. 521/125, 170; 138/155
See application file for complete search history.

(56) References Cited

U.S. PATENT DOCUMENTS

| | | | |
|---|---|---|---|
| 5,328,648 A * | 7/1994 | McBrien et al. ............... | 264/35 |
| 5,489,405 A | 2/1996 | Holbert et al. | |
| 5,880,168 A * | 3/1999 | Heinz et al. .................. | 521/174 |
| 5,900,195 A | 5/1999 | Pool et al. | |
| 5,951,796 A | 9/1999 | Murray | |
| 5,998,494 A * | 12/1999 | Hamilton ...................... | 521/166 |
| 6,288,133 B1 | 9/2001 | Hagquist | |
| 6,444,720 B1 * | 9/2002 | Klesczewski et al. ........ | 521/174 |
| 6,602,925 B1 * | 8/2003 | Van Den Bosch et al. .... | 521/99 |
| 7,223,801 B2 * | 5/2007 | Brown .......................... | 521/130 |
| 2004/0176492 A1 | 9/2004 | Brown | |
| 2005/0014857 A1 | 1/2005 | Heinemann et al. | |
| 2007/0215267 A1 * | 9/2007 | Brown .......................... | 156/158 |
| 2012/0196066 A1 | 8/2012 | Grieser-Schmitz et al. | |

FOREIGN PATENT DOCUMENTS

| | | |
|---|---|---|
| CN | 1227521 | 9/1999 |
| DE | 197 42 012 A1 | 3/1999 |
| EP | 0 865 893 A2 | 9/1998 |
| MX | 275995 | 5/2010 |
| WO | WO 00/39497 A1 | 7/2000 |
| WO | WO 01/32759 | 5/2001 |

OTHER PUBLICATIONS

U.S. Appl. No. 13/456,688, filed Apr. 26, 2012, Mohmeyer, et al.
U.S. Appl. No. 13/423,503, filed Mar. 19, 2012, Tomasi, et al.
International Search Report issued May 19, 2011 in PCT/EP2011/050120 filed Jan. 6, 2011 with English Translation of Category of Cited Documents.
U.S. Appl. No. 13/299,128, filed Nov. 17, 2011, Mohmeyer, et al.
First Office Action issued Dec. 3, 2013, in Chinese patent application No. 2011800062924 (English translation only).
Office Action w/Translation, dated Jul. 23, 2015 in Mexican Application No. MX/a/2012/008093.

* cited by examiner

*Primary Examiner* — John Cooney

(74) *Attorney, Agent, or Firm* — Oblon, McClelland, Maier & Neustadt, L.L.P.

(57) ABSTRACT

The invention relates to the envelopment of a connection of at least two pipes or parts thereof by an open-celled rigid foam, the production of such an envelope and also the use of open-celled rigid foam for protecting connections of two pipes.

22 Claims, 1 Drawing Sheet

RIGID FOAM ENVELOPMENT OF THE CONNECTIONS OF PIPES

Figure 1:
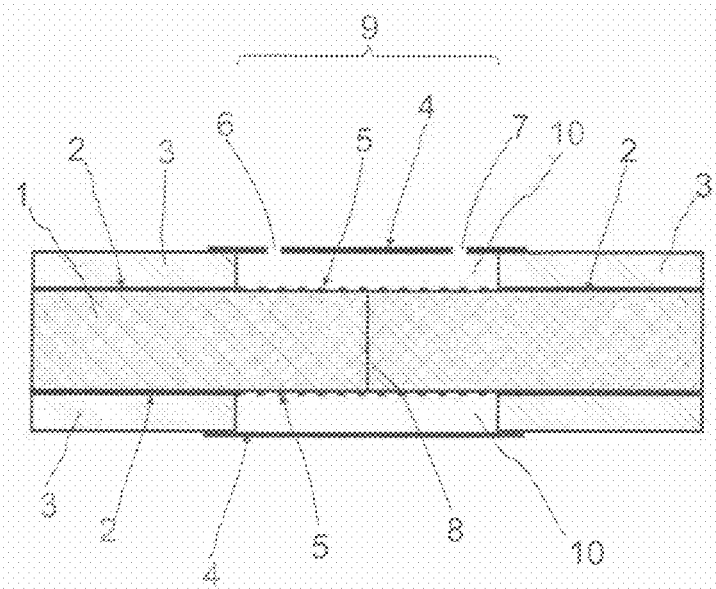

The invention relates to the connections of at least two pipes or parts thereof having a connection region of the pipes adjoining the connection, wherein the connection region is enveloped by an open-celled rigid foam, preferably a rigid polyurethane foam having polyisocyanurate structures, and also the corresponding method of enveloping the pipes with foam and the pipe systems produced thereby.

Pipes sheathed with rigid polyurethane foams are known in the prior art and are described, for example, in EP-A-865 893 and DE-A-197 42 012. Apart from these insulated pipes, pipes which are not insulated but, for example, are enveloped by a compact exterior jacket, for example a jacket based on mineral and/or organic material, are also used, for example, for the transport of gas below the surface of water. In general, such a pipe comprises a plurality of layers. The outermost layer is generally concrete for protection and to increase the weight so that the pipes do not float. Underneath this, there is a further layer comprising, for example, polypropylene, polyethylene, epoxy resin, polyurethane coating or bitumen as corrosion protection. At the connections of such uninsulated pipes, the pipe can be protected by a rigid polyurethane foam which may, if appropriate, be surrounded by at least one further layer. Such a connection region is also referred to as sleeve.

The production of these sleeves, i.e., inter alia, the production of the rigid polyurethane foam, is, like the connection of the pipes for media, usually carried out on board a pipe-laying ship immediately before the laying of the pipes. Owing to the high operating and rental costs of the pipe-laying ships, there is an ongoing need for a high degree of rationalization in the production and laying of the pipes. At the same time, the connections (sleeves) have to be of such a nature that they protect the interior pipe against destruction in the case of point stress, for example an impact with an anchor or a trawl net. A corresponding stress test is the impact test in accordance with DNV-RP-F111 ("Interface Between Trawl Gear And Pipelines").

It was therefore an object of the invention to configure connections of pipes or parts thereof in such a way that they can be produced more simply and more quickly, the mechanical requirements which the pipes have to meet in accordance with the abovementioned impact test (DNV-RP-F111) are fulfilled and, in addition, the connections have a low buoyancy.

A further object of the invention was to avoid the liquid modifiers as described, for example, in U.S. Pat. No. 5,489, 405, which are hazardous to health and often also toxic, carcinogenic or mutagenic. The liquid modifiers are often mixtures of low-boiling mineral oil fractions (e.g. Enerdex 81 from BP) or phthalates (e.g. bis(2-ethylhexyl) phthalate). Furthermore, it was an object to improve the processability of the systems used for polyurethane production. Systems comprising a liquid modifier form two phases after a very short time, frequently in less than 30 minutes. Systems without these are stable for up to three days. This offers advantages in transport and in processing.

According to the invention, this object is achieved by enveloping the connection of at least two pipes or parts thereof, preferably entire pipes, which have a connection region adjoining the connection in this connection region with open-celled rigid foam which is preferably a polyurethane foam having polyisocyanurate structures. The associated method of production and the use of open-celled rigid foam for enveloping pipes, in particular the point of connection between two pipes, are likewise provided by the invention.

FIG. 1: this figure shows the longitudinal section through the axis of two pipes (1) which are surrounded by an anticorrosion layer (2) and a jacket (3) and are connected to one another (connection (8)). In the connection region (9) of the pipes in the vicinity of the connection (8), a second anticorrosion layer (5) is applied and the space between this anticorrosion layer and the sheath (4) is filled with open-celled rigid foam (10). The sheath (4) has a filling hole (6) and a venting hole (7).

Figure 2:
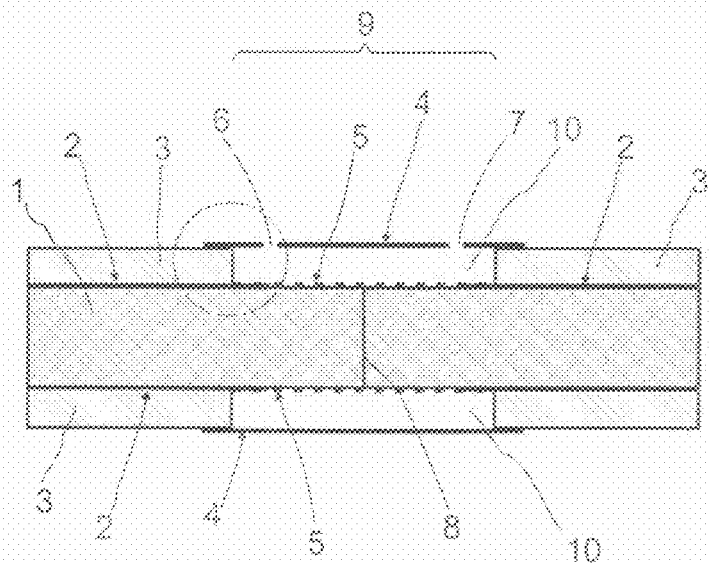
Figure 2:
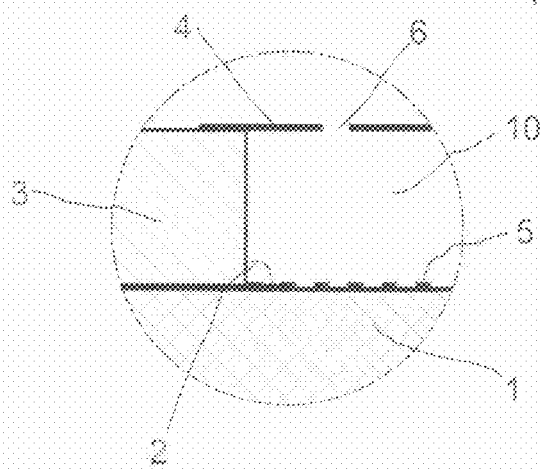

FIG. 2 also shows the longitudinal section through the axis of two pipes (1) which are surrounded by an anticorrosion layer (2) and a jacket (3) and are connected to one another (connection (8)). In the connection region (9) in the vicinity of the connection (8), a second anticorrosion layer (5) which at least partly covers the anticorrosion layer (2) in the connection region (9) is applied. The space between the anticorrosion layer (5), if appropriate also (2), and the sheath (4) is filled with open-celled rigid foam (10). The sheath (4) has a filling hole (6) and a venting hole (7).

The pipes (1) can have any cross-sectional profile. In a preferred embodiment, the pipes (1) are uninsulated pipes. In a more preferred embodiment, the pipe is a tube, i.e. the pipe has a concentric structure about its axis. The tube then preferably has an external diameter of from 6 inches to 52 inches, preferably from 10 inches to 48 inches and particularly preferably from 16 inches to 42 inches, where one inch corresponds to 2.54 cm.

The at least two pipes (1) are preferably made of steel. The pipes (1) are, in a preferred embodiment, surrounded by an anticorrosion coating (2) comprising one or more layers. In a further preferred embodiment, the single-layer or multilayer anticorrosion coating (2) has a thickness of from 0.1 cm to 2.0 cm, preferably from 0.2 cm to 1.5 cm and particularly preferably from 0.3 cm to 1.0 cm.

The anticorrosion coating (2) and/or (5) is preferably composed of bitumen, polyethylene, polypropylene, polyurethane or epoxy resin. In a further preferred embodiment, an anticorrosion coating is also present on the inside of the pipes (1).

For the purposes of the present text, the expression "uninsulated pipe" means that the pipes are, with the exception of the connections according to the invention, not enveloped by a foam, in particular not by an open-celled rigid foam. Thus, the uninsulated pipes are pipes which are preferably not provided with thermal insulation in the form of a closed-celled rigid foam. Parts of pipes which are connected to corresponding other parts of pipes are likewise comprised by the invention. However, in a preferred embodiment, the invention relates to at least two connected pipes.

The pipes (1) are preferably used for the transport of media such as gas, liquids and/or bulk material, preferably for gas, and they are preferably round. For this reason, the expression "pipes for media" will also be used in the context of the present invention.

For the definition of the connection between two pipes, reference is made to DIN EN 489 insofar as this is applicable to the present pipes. The "connection point" is the point at which the two pipes are joined to one another; the connection point is preferably a weld between two pipes.

According to the invention, the pipe for media is enveloped in the region of the connection point (8) between two pipes (1) by the open-celled rigid foam which is preferably a rigid polyurethane foam comprising polyisocyanurate structures. The connection is preferably produced by welding together at least two pipes at their ends. As a result, the anticorrosion layer is at least partly absent in this connection region (9). In a preferred embodiment, a second anticorrosion layer (5) is also applied in this connection region (9). This second anticorrosion layer preferably comprises bitumen, polyethylene, polypropylene, polyurethane coating or epoxy resin. In one embodiment, this second anticorrosion layer (5) is composed of the same material as the anticorrosion layer which surrounds the pipes (1) in the remaining region. In another embodiment, the anticorrosion layer (2) and the anticorrosion layer (5) are composed of different materials. In some embodiments, the two anticorrosion layers at least partly overlap.

The connection (8) and the connection region (9) are enveloped by the open-celled rigid foam, preferably polyurethane foam comprising isocyanurate structures. Each pipe (1) is preferably enveloped in the connection region (9) to a distance of from 5 cm to 60 cm, in each case measured from the connection point, by this open-celled rigid foam which is preferably rigid polyurethane foam comprising isocyanurate structures.

As coated pipes (1), preference is given to using ones which are, preferably with the exception of their ends, enveloped by a compact material, preferably a material based on mineral and/or organic material, particularly preferably mineral material. The region at the ends of the pipes at which no compact sheathing material is present is, after joining of the ends, preferably welding together of the ends, and preferably the application of a suitable anticorrosion coating, enveloped by the open-celled rigid foam, preferably rigid polyurethane foam comprising isocyanurate structures.

A preferred compact mineral material is steel-reinforced concrete. A preferred compact organic material is epoxy resin or polyethylene foam. Particular preference is thus given to pipes in which an anticorrosion coating based on bitumen, epoxy resin, polyurethane, polyethylene and/or polypropylene is present between mineral sheath and interior steel pipe.

The open-celled rigid foam, preferably rigid polyurethane foam comprising isocyanurate structures, is preferably present between the pipe for media and an outer sheath (4) based on polyethylene or polypropylene or sheet metal. This outer sheath (4) preferably has a thickness of from 0.1 cm to 1 cm. This means that, as indicated later, the open-celled rigid foam is preferably produced in a hollow space between pipe (1) and outer sheath (4), which is bounded laterally by the compact material.

The outer contour of the open-celled rigid foam in the connection region (9) corresponds, in a preferred embodiment, to the outer contour of the connected pipes in this region; in a preferred embodiment in which the region is the connection between the two pipes, the external diameter in the connection region (9) is in the range from 8 inches to 64 inches. Here, the external diameter is the diameter between the outer surfaces of the rigid polyurethane foam or, if this is covered by the sheath (4), between the outer surfaces of the sheath.

At least one filling hole (6) serves for filling of the hollow space between connected pipes, if appropriate with anticorrosion layer (5), and, if appropriate, the lateral jacket (4).

At least one second hole serves for venting (venting hole (7)). The introduction of the system from which the open-celled rigid foam is formed is preferably carried out under high pressure using a polyurethane machine. Pressures of from 80 bar to 180 bar, more preferably from 100 bar to 160 bar and particularly preferably from 100 bar to 140 bar are employed for filling.

The open-celled rigid foam which surrounds the connection between two pipes, if appropriate with the surrounding sheath, is also referred to as sleeve.

As indicated above, the pipes (1) are preferably gas pipes which are preferably laid below the surface of water and are more preferably not insulated, i.e. which with the exception of the region of the sheath (4) are not enveloped by a closed-celled rigid foam, preferably a polyurethane foam.

Particular preference is given to connections which have two steel pipes for media whose ends are welded to one another and in the case of which open-celled rigid foam, preferably rigid polyurethane foam comprising isocyanurate structures, is present between the pipes (1) coated with an anticorrosion layer and a jacket and a sheath (4).

The connection according to the invention is preferably present in pipelines, preferably having lengths of at least 0.5 km, particularly preferably in gas pipes, in particular in gas pipes which are present under water.

The open-celled rigid foam, preferably rigid polyurethane foam comprising isocyanurate structures, is preferably produced by reacting an isocyanate component (a) with a polyol mixture (b). The polyol mixture (b) preferably comprises (b1) polyols, (b2) catalysts and, if appropriate, (b3) chemical and/or physical blowing agents, (b4) crosslinkers, (b5) chain extenders, (b6) cell regulators and/or (b7) additives. The mixture of these listed constituents is also referred to as polyurethane system.

As indicated above, the at least two pipes are, outside the connection region (9) in which they are enveloped by the open-celled rigid foam, preferably rigid polyurethane foam comprising isocyanurate structures, preferably surrounded by a compact mineral and/or organic material (jacket 3). Preference is given to methods in which a sheath (4) is placed over the jacket (3) in the connection region (9) between at least two pipes (1) which are surrounded by a jacket (3) so that a hollow space is formed between connected pipes and sheath (4). Gaps arising between the jacket and the sheath are preferably sealed. In the sheath (4), there is at least one opening through which the polyurethane system is introduced. In one embodiment, this opening is so large that the displaced air can escape at the same time as the polyurethane system is introduced. In other embodiments, the sheath (4) has at least one further opening (venting hole (7)) through which the air can escape during the filling procedure. Reaction of the polyurethane system forms an open-celled rigid polyurethane foam, preferably a rigid polyurethane foam comprising isocyanurate structures. In a preferred embodiment, the sheath (4) also remains at the connection after curing of the open-celled rigid foam. In another embodiment, the sheath (4) is removed again and is more preferably reusable. Here, preference is given to using a polyethylene film, a polypropylene film or a metal sheet as sheath (4), with the opening for venting preferably being arranged at the highest point. Preference is given to fixing films or metal sheet on the compact mineral material by means of clamping straps.

The above-described hollow space between pipes and shell is filled with the isocyanate component (a) and the polyol mixture (b) and, if appropriate, further components, preferably by means of a polyurethane metering machine which operates under high or low pressure.

These starting materials for the polyurethane system are described below:

Isocyanate components (a) used are the customary aliphatic, cycloaliphatic and in particular aromatic diisocyanates and/or polyisocyanates. Particular preference is given to mixtures of diphenylmethane diisocyanate and polyphenylene-polymethylene polyisocyanates (crude MDI), in another preferred embodiment diphenylmethane diisocyanate (MDI). The isocyanates can also have been modified, for example by incorporation of uretdione, carbamate, isocyanurate, carbodiimide, allophanate and in particular urethane groups. The isocyanate component (a) can also be used in the form of polyisocyanate prepolymers. These prepolymers are known in the prior art. They are prepared in a manner known per se by reacting the above-described polyisocyanates (a), for example at temperatures of about 80° C., with compounds having hydrogen atoms which are reactive toward isocyanates, preferably polyols, to form polyisocyanate prepolymers. The polyol:polyisocyanate ratio is generally selected so that the NCO content of the prepolymer is from 8 to 25% by weight, preferably from 10 to 22% by weight, particularly preferably from 13 to 20% by weight. In particular, crude MDI is used for the production of rigid polyurethane foams. In a preferred embodiment, the isocyanate component (a) is selected so that it has a viscosity of less than 600 mPas, preferably from 100 to 600 mPas, particularly preferably from 120 to 400 mPas, in particular from 180 to 320 mPas, measured in accordance with DIN 53019 at 25° C.

As compound which is reactive toward polyisocyanates (constituent or component b), it is possible to use polyols which are generally known for this purpose. Possibilities are, for example, compounds having at least two groups which are reactive toward isocyanate, i.e. at least two hydrogen atoms which are reactive toward isocyanate groups. Examples are compounds having OH groups, SH groups, NH groups and/or $NH_2$ groups. Preferred compounds which are reactive toward isocyanates are polyols (constituent b1 or component b1). As polyols (b1), preference is given to using compounds based on polyesterols and/or polyetherols. The functionality of the polyetherols and/or polyesterols is generally from 1.9 to 8, preferably from 2.2 to 6, particularly preferably from 2.3 to 5. The polyols (b1) have a hydroxyl number of greater than 70 mg KOH/g, preferably greater than 100 mg KOH/g, particularly preferably greater than 150 mg KOH/g, very particularly preferably 200 mg KOH/g. It has been found to be useful for the upper limit to the hydroxyl number to be generally 600 mg KOH/g, preferably 500 mg KOH/g, in particular 400 mg KOH/g, very particularly preferably 350 mg KOH/g. The abovementioned OH numbers are based on the totality of polyols (b1), which does not rule out the possibility of individual constituents of the mixture having higher or lower values.

It has surprisingly been found that, according to the invention, an index which is very low for PIR systems suffices to achieve the aims in the objects formulated at the outset.

Contrary to general experience that PIR systems have poor flow properties, the flowability (mold-filling capability) of the foam according to the invention is sufficient for filling even large pipe diameters, e.g. the diameters preferred according to the invention.

Furthermore, it is surprisingly possible to set the OHN to such a low value that the volumetric mixing ratio, i.e. the ratio of the polyol component to the isocyanate component, is about 1:1 and the PIR reaction nevertheless proceeds, with small amounts of PIR catalyst, to a sufficient extent to make the desired strength gains.

This is very advantageous since existing processing machines can, without an additional outlay, process the foam which is preferred according to the invention and the amounts of the individual components to be processed are approximately the same, which is of great importance for logistic reasons in the case of offshore projects.

The component (b1) preferably comprises polyether polyols which are prepared by known processes, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule comprising from 2 to 8, preferably from 3 to 8, reactive hydrogen atoms in bound form or by cationic polymerization using Lewis acids such as antimony pentachloride, boron fluoride etherate, etc., or bleaching earth as catalysts. Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Possible starter molecules are alcohols such as glycerol, trimethylolpropane (TMP), pentaerythritol, sucrose, sorbitol and also amines, such as methylamine, ethylamine, isopropylamine, butylamine, benzylamine, aniline, toluidine, toluenediamine (TDA), naphthylamine, ethylenediamine, diethylenetriamine, 4,4"-methylenedianiline, 1,3-propanediamine, 1,6-hexanediamine, ethanolamine, diethanolamine, triethanolamine and the like. It is also possible to use condensation products of formaldehyde, phenol and diethanolamine or ethanolamine, formaldehyde, alkylphenols and diethanolamine or ethanolamine, formaldehyde, bisphenol A and diethanolamine or ethanolamine, formaldehyde, aniline and diethanolamine or ethanolamine, formaldehyde, cresol and diethanolamine or ethanolamine, formaldehyde, toluidine and diethanolamine or ethanolamine and also formaldehyde, toluenediamine (TDA) and diethanolamine or ethanolamine and the like as starter molecules. Preference is given to using diethylene glycol, propylene glycol, pentaerythritol and glycerol as starter molecule.

In one embodiment, the polyol component (b1) comprises only one polyol, and in a preferred embodiment the component (b1) comprises a mixture of a plurality of polyols.

For the purposes of the present invention, catalysts (b2) are firstly catalysts which accelerate the reaction of the isocyanates with the polyols (b2) and also ones which promote the trimerization of isocyanates, i.e. the formation of polyisocyanurate (PIR), (b2b), which are also referred to as trimerization catalysts. The catalysts b2a and b2b are each used individually in a preferred embodiment and are used together in another preferred embodiment.

At least one trimerization catalyst (2b2) is preferably added to the polyol.

As PIR catalyst (b2b), preference is given to using alkali metal and/or alkaline earth metal compounds, preferably alkali metal salts such as potassium acetate, potassium octoate and potassium formate. Further preferred alkali metal compounds are, inter alia, alkali metal hydroxides such as sodium hydroxide and alkali metal alkoxides such as sodium methoxide and potassium isopropoxide and also alkali metal salts of long-chain fatty acids having from 10 to 20 carbon atoms and if appropriate lateral OH groups. Particular preference is given to potassium acetate as alkali metal compound.

In an alternative preferred embodiment, PIR catalysts such as tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide are used as trimerization catalysts (b2b).

In a further preferred embodiment, the alkali metal and/or alkaline earth metal compounds, preferably alkali metal compounds, and PIR catalysts such as tris(dialkylaminoalkyl)-s-hexahydrotriazines, in particular tris(N,N-dimethylaminopropyl)-s-hexahydrotriazine, tetraalkylammonium hydroxides, preferably tetramethylammonium hydroxide, are used together.

Catalysts (b2a) used for producing the rigid foams are, in particular, compounds which strongly accelerate the reaction of the reactive hydrogen atoms, in particular of hydroxyl-comprising compounds, of the component (b1) and, if appropriate, (b4) and/or (b5) with the organic modified or unmodified polyisocyanates (a).

In a preferred embodiment, basic amine compounds, preferably tertiary amines such as dimethylbenzylamine and/or dimethylcyclohexylamine, are used as catalysts (b2a).

As amine catalysts, preference is given to using strongly basic amines. Preferred amines are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, N,N,N',N'-tetramethyl-2,2'-oxybis(ethylamine), methylbis(2-dimethylaminoethyl)amine, bis(dimethyldiethylaminoethyl)ether, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and aminoalkanol compounds such as triethanolamine, triisopropanolamine, N-methyldiethanolamine and N-ethyldiethanolamine and dimethylethanolamine, which serve as gelling and/or blowing catalysts and promote the gelling reaction and also the reaction of the isocyanate with water. Other preferred gelling catalysts are diazobicycloundecane, 1,4-diazabicyclo[2.2.2]octane (Dabco), 1-methylimidazole and more preferably dimethylcyclohexylamine.

The catalysts (b2b) are generally used in an amount of from 0.001% by weight to 2% by weight, preferably from 0.01% by weight to 1% by weight, particularly preferably from 0.01% by weight to 0.5% by weight, very particularly preferably from 0.01% by weight to 0.3% by weight, of catalyst, based on the weight of the polyol mixture (b) (but without physical blowing agents).

It has surprisingly been found that even the abovementioned, very small amounts of PIR catalyst are sufficient to achieve the aims formulated in the objects.

It has likewise surprisingly been found that the PIR reaction does not have an adverse effect on the proportion of open cells in the foam.

The component (b) comprises chemical and/or physical blowing agents as constituent (b3). Preference is given to using chemical blowing agents. Water or carboxylic acids, preferably formic acid, are preferred. A particularly preferred chemical blowing agent is water. The chemical blowing agent is generally used in an amount of from 0.1 to 3% by weight, in particular from 0.2 to 2.0% by weight, particularly preferably from 0.3 to 1.5% by weight, based in the weight of the component (b), preferably polyol mixture (b) (but without physical blowing agents).

As mentioned above, the polyol mixture comprises, in another embodiment, physical blowing agent. Physical blowing agents are compounds which are dissolved or emulsified in the starting materials for polyurethane production and vaporize under the conditions of polyurethane formation. These are preferably hydrocarbons, halogenated hydrocarbons and perfluorinated alkanes, e.g. perfluorohexane, chlorofluorocarbons, and also ethers, esters, ketones and/or acetals. These are preferably used in an amount of from 0.01% by weight to 20% by weight, more preferably from 0.1% by weight to 15% by weight, particularly preferably from 0.5 to 10% by weight, based on the total weight of the components b). Particular preference is given to using fluorinated hydrocarbons as blowing agents.

In a preferred embodiment, the polyol mixture (b) comprises cell regulators as constituent (b6). For the purposes of the present invention, cell regulators are compounds which during the foaming process influence the cell development, cell stabilization and also the subsequent cell opening. An example is Ortegol 501 (from Goldschmidt).

The cell regulators are generally used in an amount of from 0.01 to 8% by weight, preferably from 0.02 to 6% by weight, particularly preferably from 0.05 to 4% by weight, based on the total weight of the polyol mixture (b) (but without physical blowing agents). It is also possible to use a mixture of various cell regulators.

In a further preferred embodiment, the polyol mixture (b) comprises crosslinkers as constituent (b4). For the purposes of the present invention, crosslinkers are compounds which have a molecular weight of from 60 g/mol to <400 g/mol and have at least 3 hydrogen atoms which are reactive toward isocyanates. An example is glycerol. The crosslinkers are generally used in an amount of from 1% by weight to 10% by weight, preferably from 2% by weight to 6% by weight, based on the total weight of the polyol mixture (b) (but without physical blowing agents).

In a further preferred embodiment, the polyol mixture (b) comprises chain extenders as constituent (b5) in order to increase the crosslinking density. For the purposes of the present invention, chain extenders are compounds which have a molecular weight of from 60 g/mol to <400 g/mol and have 2 hydrogen atoms which are reactive toward isocyanates. Examples are butanediol, diethylene glycol, dipropylene glycol and ethylene glycol. The chain extenders are generally used in an amount of from 1% by weight to 20% by weight, preferably from 2% by weight to 15% by weight, based on the total weight of the polyol mixture (b) (but without physical blowing agents).

The components (b4) and (b5) can be used individually or in combination in the polyol mixture.

To allow isocyanurate structures to form in the foam, the index is preferably in the range from 160 to 500, particularly preferably from 160 to 400, in particular from 165 to 300, very particularly preferably from 170 to 250, most preferably from 180 to 250.

The overall foam density (total amount of foam divided by the hollow volume of the sleeve) in accordance with DIN EN ISO 845 of the polyurethane foam comprising isocyanurate structures is preferably in the range from 60 kg/m$^3$ to 500 kg/m$^3$, particularly preferably from 80 kg/m$^3$ to 400 kg/m$^3$, in particular from 90 to 300 kg/m$^3$, very particularly preferably from 100 kg/m$^3$ to 250 kg/m$^3$. For the present purposes, the overall foam density is the foam density distribution over the volume occupied by the open-celled rigid foam.

In a particularly preferred embodiment, the rigid polyurethane foam having isocyanurate structures is the reaction product of a polyol component B and an isocyanate component A. The polyol component comprises at least from 45 to 55 parts by weight of polyol A, from 15 to 35 parts by weight of polyol B and from 10 to 30 parts by weight of polyol C, from 1.5 to 4 parts by weight of cell regulator, preferably Ortegol 501 from Goldschmidt having the 2009 composition, from 0.2 to 0.8 part by weight of an amine catalyst, preferably N,N-dimethylcyclohexylamine, from 0.02 to 0.3 part by weight of a trimerization catalyst, preferably potassium acetate, and from 0.2 to 1 part by weight of water, with all the parts by weight of the constituents introduced into this polyol component B adding up to 100. The polyols A, B and C are described in more detail in the example.

The isocyanate component A in this preferred embodiment comprises at least one of the abovementioned isocyanates, preferably polymeric MDI, which is preferably added in an amount of from 105 to 130, preferably from 110 to 125, particularly preferably from 114 to 118, parts by weight to the 100 parts by weight of the polyol component B.

Although the systems known from the prior art were able to pass the impact test (specifically: DNV-RP-F111—rectangular hammer head), this was only at a relatively high overall density of the foam. In the particularly preferred embodiment mentioned, the foams according to the invention withstand an impact of 7 kJ in the impact test at a foam density of 120 kg/m$^3$. The foams known from the prior art require 160 kg/m$^3$. In comparison, the foams according to the invention withstand 12 kJ at 160 kg/m$^3$. The foams known from the prior art do not. All impact values apply to the test carried out without sheath.

If appropriate, additives (b6) can also be incorporated into the polyurethane system according to the invention. For the purposes of the present invention, additives (b6) are the customary auxiliaries and additives known in the prior art, but without physical blowing agents. Mention may be made by way of example of surface-active substances, fillers, dyes, pigments, flame retardants, antistatics, hydrolysis inhibitors and/or fungistatic and bacteriostatic substances.

The invention further provides the method of enveloping a pipe connection (8) comprising at least two pipes (1) or parts thereof connected to one another, wherein an outer sheath is placed in the connection region adjoining the connection point of the pipes in such a way that a hollow space arises in the connection region between the outer sheath and the connected pipes or pipe sections and an open-celled rigid foam is then produced in this hollow space. Preference is given to using the rigid foams which have been described above, in particular polyurethane foams having the compositions indicated there. More preferably, any anticorrosion coating (2) which is absent in the connection region is supplemented by the anticorrosion coating (5) before enveloping the pipe connection with foam.

In a preferred embodiment, the connected pipes are, at least in the region adjoining the connection region, surrounded by a jacket (3) and an outer sheath (4) is fastened over the connection region and the jacket so as to form a hollow space which is bounded on the inside by pipes (1) and their connection (8), laterally by the jacket (3) of the pipes and on the outside by the outer sheath (4) in the connection region (9).

A system which cures to form an open-celled rigid foam is introduced into this hollow space. This system is preferably a system for producing polyurethane foam having isocyanurate structures, which system preferably comprises at least one A component composed of polyisocyanate (a) and a B component comprising a compound (b) which is reactive toward polyisocyanate and is preferably produced by mixing the A component and the B component immediately before filling of the hollow space.

The sheath (4) more preferably comprises at least one filling hole (6), preferably on its upper side, and at least one venting hole (7), likewise preferably on the upper side, through which the air displaced from the hollow space during filling of the system and formation of the open-celled rigid foam can escape.

In a further preferred embodiment, the outer sheath is of such a nature that it can be removed again after production of the open-celled rigid foam. The sheath is more preferably coated with a release agent or with a very thin film which prevents adhesion of the sheath to the rigid foam and thus aids removal of the sheath.

The invention further provides for the use of open-celled rigid foams, preferably polyurethane foams having isocyanurate structures, for the envelopment of pipes, in particular the envelopment of the connection point of at least two pipes. These are preferably pipes used for the transport of media, preferably gases or liquids, more preferably mineral oil or natural gas, particularly preferably gases, in particular natural gas.

In further preferred embodiments, the pipes are laid under a surface of water; the pipes are particularly preferably laid in waters in which fishing with trawl nets is carried out.

The invention is illustrated below by means of an example which serves to illustrate the subject matter of the invention but does not restrict the invention in any way.

EXAMPLE

The component B comprising the compound (b) which is reactive toward polyisocyanate is based on the following polyol mixture:

| Polyol type | OH number | Functionality | Viskosity [25° C.] | Molecular weight |
|---|---|---|---|---|
| Polyol A | 403 mg KOH/g | 3.9 | 2200 | 545 |
| Polyol B | 42 mg KOH/g | 2.7 | 950 | 3550 |
| Polyol C | 104 mg KOH/g | 2 | 155 | 1070 |

Polyol A is based on sucrose, pentaerythritol, diethylene glycol and propylene oxide. Polyol B is based on glycerol, propylene oxide and ethylene oxide. Polyol C is based on propylene glycol and propylene oxide.

| Formulation | |
|---|---|
| Material | Proportion by weight |
| Polyol A | 49.72 |
| Polyol B | 25 |
| Polyol C | 20 |
| Cell regulators (e.g. Ortegol 501 from Goldschmidt) | 4 |
| N,N-Dimethylcyclohexylamine (DMCHA) | 0.5 |
| Potassium acetate | 0.08 |
| Water | 0.7 |
| Lupranat M 20S (polymeric MDI) | 116 |
| Isocyanate index | 160 |

The polyol component is firstly mixed with the polyols A, B and C, the cell regulator, DMCHA and potassium acetate and also water (component B). A polymeric MDI is then added as component A to this component B, the batch is mixed well using a commercial high-pressure unit and is introduced via the filling hole into a hollow space provided. This hollow space is formed on a welded pipe connection whose pipes (diameter: 48 inches) are surrounded by a concrete jacket. As surrounding sheath, use is made of a metal sheet which is drawn tight by means of three clamping straps at each of the concrete ends of the pipes and additionally in the middle of the metal sheet. The metal sheet produces a connection region having a thickness of 90 mm and a width of 60 cm. The foam rises in the hollow space of the sleeve and fills it completely within the fiber time of the foam. When foam begins to come out of the space, the filling hole and the venting hole are closed in order to avoid further outflow of the foam from the hollow space of the sleeve. An overall foam density of 162 kg/m$^3$ is obtained.

The sleeve was (without metal sheet) subjected to the impact test in accordance with DNV-RP-F111 using a rectangular hammer and withstood an impact of 12 kJ without damage to the anticorrosion coating on the steel pipe.

The invention claimed is:

1. A connection of at least two pipes or parts thereof having a connection region of the pipes adjoining the connection, wherein the connection region is enveloped by an open-celled rigid foam,
    wherein the rigid foam is a polyurethane foam comprising isocyanurate structures, and
    wherein the polyurethane foam is the reaction product of at least the following components:
    polyisocyanate (a)
    (ii) a composition (b), comprising:
    at least one polyol (b1) wherein a functionality of the at least one polyol is from 1.9 to 8 and a hydroxyl number of the at least one polyol is from 150 to 600 KOH/g;
    (iia) a catalyst (b2) at least comprising 0.2 to 0.8 wt. % of an amine and 0.02 to 0.3 wt. % of at least one trimerization catalyst (b2b) wherein the wt. % is based on the total weight of the composition (b):
    (iib) cell regulators (b3)
    (iic) chemical and/or physical blowing agents (b4); and
    (iid) optionally, crosslinkers (b5); and
    (iie) optionally, chain extenders (b6);
    wherein the open-celled rigid foam withstands an impact of 7 kJ in the DNV-RP-F111 rectangular hammer head impact test at a foam density of 120 kg/m$^3$, and
    wherein the open-celled rigid foam withstands an impact of 12 kJ in the DNV-RP-F111 rectangular hammer head impact test at a foam density of 160 kg/m$^3$.

2. The connection according to claim 1, wherein an isocyanate index of the components (a) and (b) is from 160 to 500.

3. The connection according to claim 1, wherein the polyisocyanate (a) comprises diphenylmethane diisocyanate and polyphenylenepolymethylene polyisocyanate.

4. The connection according to claim 1, wherein a viscosity of the polyisocyanate (a) is from 110 to 600 mPas, measured in accordance with DIN 53019 at 25° C.

5. The connection according to claim 1, wherein the at least one polyol (b1) is at least one of a polyesterol and a polyetherol.

6. The connection according to claim 5, wherein a viscosity of the at least one polyol (b1) measured at 25° C. is from 0.11 to 6 Pa·s.

7. The connection according to claim 5, wherein the hydroxyl number of the at least one polyol (b1) is from 200 to 400 mg KOH/g.

8. The connection according to claim 5, wherein the functionality of the at least one polyol (b1) is from 2.2 to 6.

9. The connection according to claim 1, wherein the trimerization catalyst (b2b) is at least one selected from the group consisting of potassium acetate, potassium formate and potassium octoate.

10. The connection according to claim 1, wherein a width of the connection region of each pipe is from 5 cm to 80 cm, measured from the point of connection of the pipes in the axial direction.

11. The connection according to claim 1, wherein at least one pipe is composed of metal and comprises an anticorrosion coating at least on the outside and is surrounded by a mineral enveloping material.

12. A pipe system comprising at least one connection according to claim 1.

13. A method of enveloping a pipe connection comprisin a at least two pipes or parts thereof connected to one another with foam, said method comprising:
    enveloping said pipe connection with said foam, wherein an outer sheath is placed in the connection region adjoining the connection point of the pipes in such a way that a hollow space arises in the connection region between the outer sheath and the connected pipes or pipe sections and an open-celled rigid foam is then produced in this hollow space to obtain the pipe connection of claim 1.

14. The method according to claim 13, wherein the pipes are, at least in the region adjoining the connection region, surrounded by a jacket (3) and an outer sheath is fastened over the connection region and the jacket so as to form a hollow space which is bounded on the inside by the connection and the connection region of the pipes, laterally by the jacket of the pipes and on the outside by the outer sheath in the connection region.

15. The method according to claim 13, wherein an outer sheath which can be removed again afier production of the open-celled rigid foam is used.

16. The connection according to claim 1, which does not contain a liquid modifier selected from the group consisting of low-boiling mineral oil fractions and phthalates.

17. A connection of at least two pipe or parts thereof having a connection region of the pipes adjoining the connection, wherein the connection region is enveloped by an open-celled rigid foam,
    wherein the rigid foam is a polyu . thane foam having isocyanurate structures and wherein the polyurethane foam is the reaction product of at least the following components:
    (i) polyisocyanate (a),
    (ii) a composition (b) which is reactive toward polyisocyanate and comprises:
        (A) a polyol A based on sucrose, pentaerythritol, diethylene glycol and propylene oxide;
        (B) a polyol B based on glycerol, propylene oxide and ethylene oxide; and
        (C) a polyol C based on propylene glycol and propylene oxide;
        (iia) catalyst (b2) comprising at least one trimerization catalyst (b2b);
        (iib) a cell regulator (b3); and
        (iic) a chemical and/or physical blowing agent (b4);
    wherein an amount of the catalyst (b2b) is from 0.001% by weight to 2% by weight based on the weight of the polyol mixture (b) without a physical blowing agent,
    wherein the open-celled rigid foam withstands an impact of 7 kJ in the DNV-RP-F111 rectangular hammer head impact test at a foam density of 120 kg/m$^3$, and wherein the open-celled rigid foam withstands an impact of 12 kJ in the DNV-RP-F111 rectangular hammer head impact test at a foam density of 160 kg/m$^3$.

18. The connection according to claim 17, wherein the composition (B) further comprises:
(iid) a crosslinker (b5).

19. The connection according to claim 17, wherein the composition (B) further comprises: (iie) a chain extender (6).

20. The connection according to claim 17, wherein
polyol A has a OH number of 403 mg KOH/g, a functionality of 3.9, a viscosity of 2200 and a molecular weight of 545 g/mol,
wherein polyol B has a OH number of 42 mg KOH/g, a functionality of 2.7, a viscosity of 950 and a molecular weight of 3550 g/mol,
wherein polyol C has a OH number of 104 mg KOH/g, a functionality of 2, a viscosity of 155 and a molecular weight of 1070 g/mol;
wherein said viscosity is given in mPas, measured in accordance with DIN 53019 at 25° C.

21. The connection according o claim 17, comprising:
49.72 parts by weight of polyol A,
25 parts by weight of polyol B,
20 parts by weight of polyol C,
4 parts by weight of cell regulators,
0.5 parts by weight of N,N-dimethylcyclohexylamine (DMCHA),
0.08 parts by weight of potassium acetate,
0.7parts by weight of water,
116 parts by weight of polymeric MDI,
wherein an isocyanate index is 160.

22. The connection of at least two pipes or parts thereof having a connection region of the pipes adjoining the connection according to claim 1, wherein the connection region is enveloped by an open-celled rigid foam,
wherein
the pipes are tubes which are a concentric structure about its axis with an external diameter of from 6 inches to 52 inches.

* * * * *